March 2, 1954 F. S. AJERO 2,670,883
SPREADER AND SEEDER APPARATUS
Original Filed Jan. 25, 1950 3 Sheets-Sheet 1
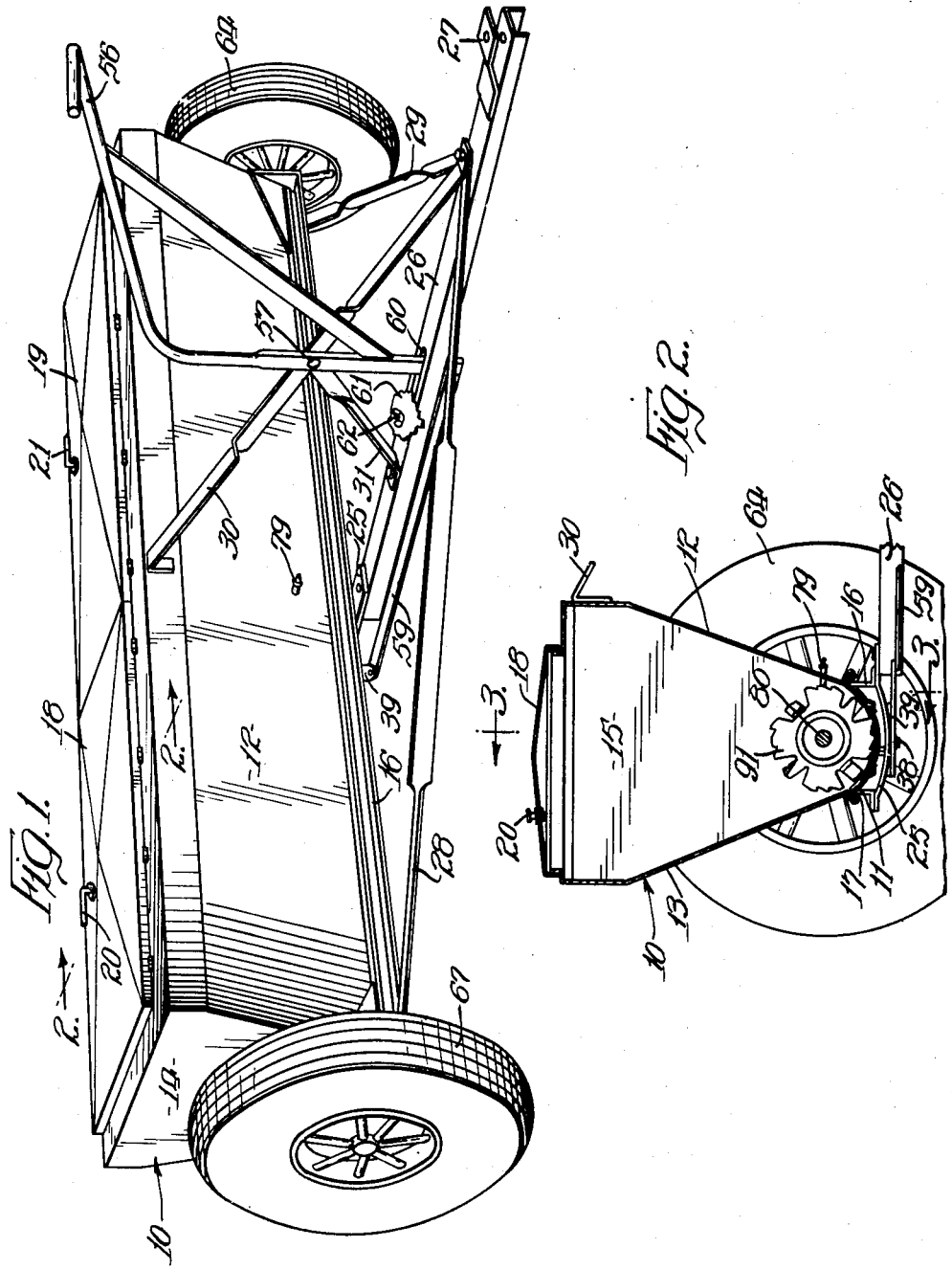
INVENTOR.
Fortunato S. Ajero
BY
Kegan and Kegan
Attys.

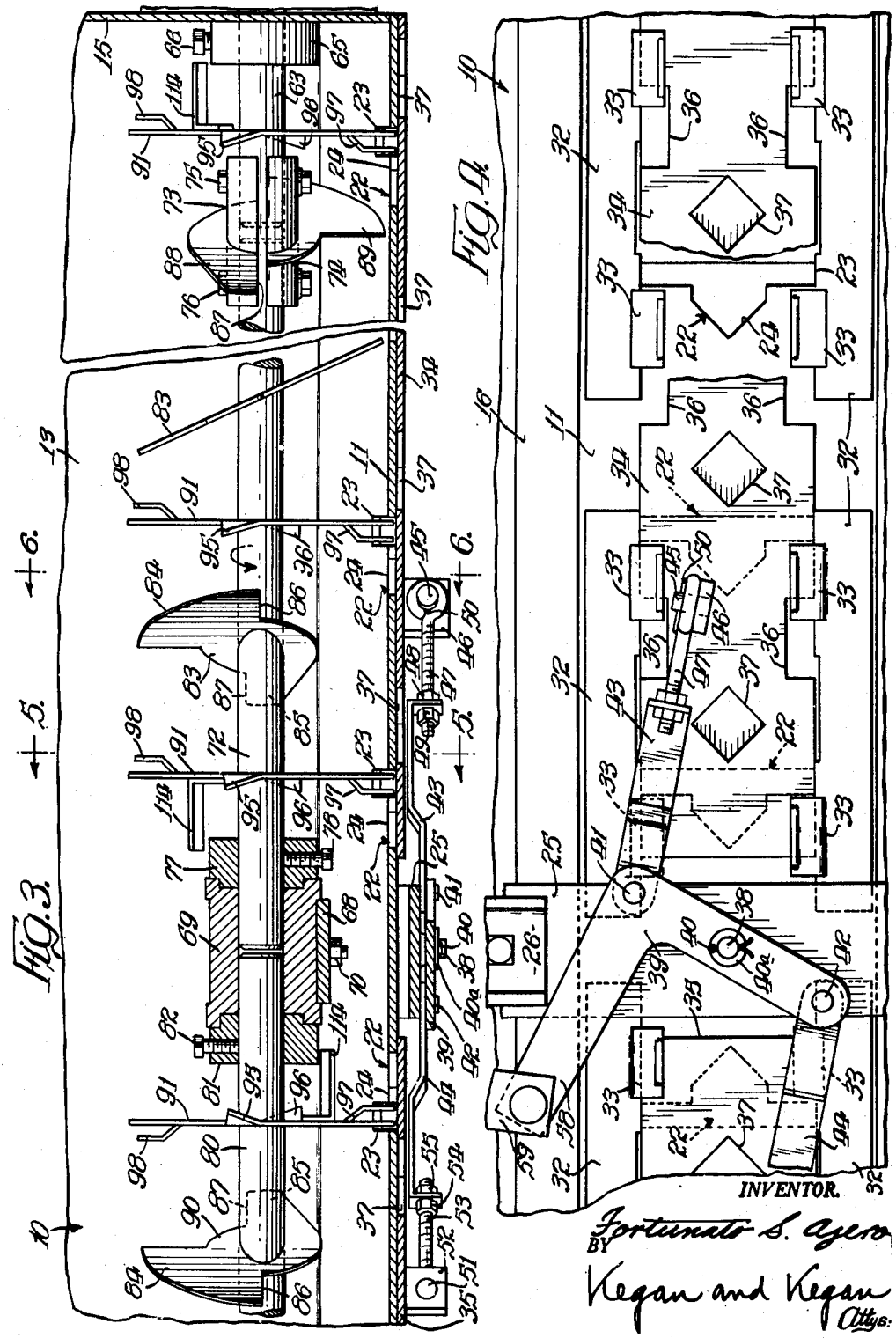

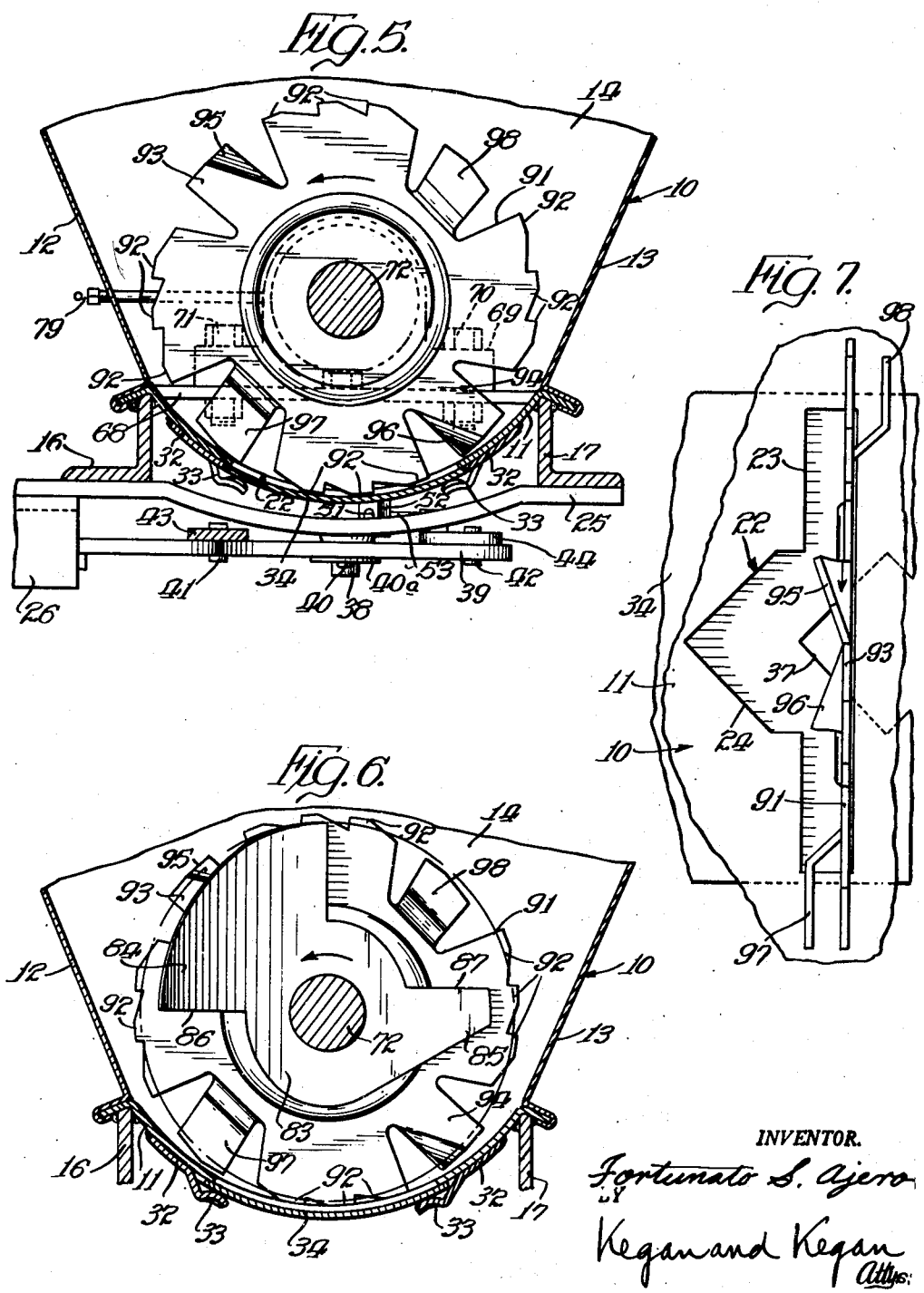

Patented Mar. 2, 1954

2,670,883

UNITED STATES PATENT OFFICE 2,670,883

SPREADER AND SEEDER APPARATUS

Fortunato S. Ajero, Chicago, Ill., assignor, by mesne assignments, to Avco Manufacturing Corporation, New York, N. Y., a corporation of Delaware Original application January 25, 1950, Serial No. 140,495, now Patent No. 2,626,729, dated January 27, 1953. Divided and this application March 9, 1951, Serial No. 214,788

8 Claims. (Cl. 222—485)

My invention relates generally to improvements in material spreading apparatus, and more particularly to apparatus for discharging fertilizers, seeds, fluent solid chemicals, and like material from the ported hopper of a spreader. My invention has special application to material spreaders of the type shown and described in Patent No. 2,510,231, issued June 6, 1950, to Edmond A. Juzwiak, and entitled Spreader.

This application is a divisional application of my co-pending case, Serial No. 140,495, filed January 25, 1950, and entitled Spreader and Seeder Apparatus, now patented under No. 2,626,729.

A principal object of my invention is to provide shutter means for material spreading apparatus which may be quickly and easily detached and replaced, for purposes of maintenance, repair and replacement.

Another object of the present invention is the provision of improved shutter means which combine the features of quick detachability and close fit.

In its broad aspect my invention comprises the combination with a material spreader including a hopper having a series of aligned discharge ports in the bottom thereof, of two parallel rows of spaced apart fingers secured to said hopper on opposite sides of the discharge ports, a shutter strip having at least one aperture therein adapted to register in varying degree with one of the discharge ports, as said strip is moved relative to said hopper bottom, said strip having a plurality of edge indentations registrable with the rows of fingers, but only when said strip is moved to a position in which the discharge ports are covered, and drive means for moving the shutter strip relative to said hopper bottom.

In preferred embodiments of my invention the bottom of the hopper and the strip are both curved, but the shutter strip is formed from a resilient material and in the unflexed position has a slightly greater radius of curvature than the hopper bottom. Hence upon being assembled to the hopper the shutter strip is flexed, and thereby fits snugly against said hopper bottom.

In order that my invention may be more fully disclosed, reference is had to the accompanying drawings which illustrate one form of shutter means embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a perspective view of a wheel supported material spreader embodying my invention;

Figure 2 is a fragmentary side elevational view taken in section on the line 2—2 of Figure 1;

Figure 3 is a fragmentary front elevational view taken in section on the line 3—3 of Figure 2;

Figure 4 is a fragmentary bottom view showing my novel shutter means and a portion of the control mechanism therefor;

Figure 5 is a fragmentary side elevational view taken in section on the line 5—5 of Figure 3;

Figure 6 is a fragmentary side elevational view taken in section on the line 6—6 of Figure 3; and Figure 7 is a fragmentary plan view of the bottom interior of the hopper, showing the discharge port partially open, the drive shaft being omitted for purposes of clarity.

Like reference characters designate like parts in the drawings and in the description of my invention following hereafter.

Before proceeding with the detailed description of the construction and operation of the several parts comprising the embodiments shown in the drawings, and to better indicate the concepts of my invention, I describe, in brief outline below, the organization and coaction of the principal subcombinations and parts comprising said embodiments. More particularly, my spreader and seeder apparatus is shown as including (1) a hopper in which the material is placed, said hopper having one or more discharge openings therein, (2) shutter means for regulating the discharge area of each of said discharge openings, (3) an armature rotatable within the hopper and including (4) means for agitating and distributing material lengthwise of the armature, with substantially no tangential or radial flow of material relative to the armature and against the sides of the hopper, and (5) means for positively discharging a measured quantity of material from each discharge port, in which the quantity discharged varies with the setting of the shutter means.

Turning now to Figures 1, 2 and 5, the hopper designated generally by the numeral 10, includes an arcuate bottom plate 11, a front wall 12, a rear wall 13 and two end walls 14 and 15. A pair of angle irons 16 and 17 extend along the bottom of the hopper 10 to provide transverse stiffening at the points of connection between the front and rear walls 12 and 13 and the bottom plate 11. The hopper 10 is further provided with a pair of hinged covers 18 and 19 and their associated handles 20 and 21, whereby the hopper 10 may be loaded with material which is to be dispensed. As is best shown in Figure 7, taken in conjunction with Figure 3, the bottom plate 11 includes a plurality of spaced apart discharge openings 22, each of which includes a substantially rectangular portion 23 and a principal discharge area 24.

Referring again to Figures 1 and 5, a center bridging member 25 is secured to the lower leg portions of the angle irons 16 and 17. A drawbar 26 extends from and is secured to one end of the bridging member 25. A tractor hitch 27 is fastened to the other end of the drawbar 26. Two tie rods 28, 29 extend from opposite ends of the hopper 10 to the drawbar 26 adjacent the free end thereof. A third tie rod 30 extends from the upper portion of the front wall 12 to the drawbar 26, and is further strengthened by the stiffener 31.

As is best shown in Figures 3 and 4, a plurality of strips 32 are spaced along each side of the bottom plate 11, on the under surface thereof. A pair of spring fingers 33, 33 extend from each of the strips 32 toward the center line of the bottom plate 11, and provide sliding support for the shutter plates 34 and 35, said shutter plates 34 and 35 being positioned on opposite sides of the center bridging member 25. Figure 4 shows each of the shutter plates 34 and 35 as having a plurality of notches 36 in each longitudinal edge thereof, while in addition, each of the shutter plates 34 and 35 includes a plurality of apertures 37, the spacing of which corresponds to the spacing between the discharge openings 22 in the bottom plate 11. Similarly, the spacing of the notches 36 in the edges of the shutter plates 34 and 35 corresponds to the spacing of the spring fingers 33 of the strips 32; however, when the notches 36 are aligned with the fingers 33, the apertures 37 are out of register with the discharge openings 22.

Referring now to Figures 4 and 5, a hinge post 38 extends downwardly from the center bridging member 25. A bell crank 39 pivots on the hinge post 38, and is secured thereto by the cotter pin 40 and the retaining washer 40a. At diametrically opposed points on the bell crank 39 are two pivot pins 41 and 42, a pair of straps 43 and 44 being pivotally connected to the bell crank 39 by the pins 41 and 42, respectively. A pintle 45 extends from the shutter lug 46 on the shutter plate 34, and is connected to the strap 43 by the eye bolt 47. A pair of nuts 48 and 49 adjustably secure the eye bolt 47 to the strap 43, while the cotter pin 50 retains the eye bolt 47 on the pintle 45. Similarly, the strap 44 is connected to the pintle 51 of the shutter lug 52 projecting beneath the shutter plate 35, by the eye bolt 53 and the securing nuts 54 and 55.

When the bell crank 39 is turned in a clockwise direction, as viewed in Figure 4, it is apparent that the shutter plates 34 and 35 move away from the center bridging member 25. Counterclockwise rotation of the bell crank 39 results in movement of the shutter plates 34 and 35 in the opposite direction, whereupon the apertures 37 may be brought into register with the discharge opening 22 in varying degree. In order to provide manual control of the position of the shutter plates 34 and 35 relative to the bottom plate 11, I provide a handle 56 (Figure 1), which pivots about the pin 57 and is connected to the arm 58 of the bell crank 39 by the connecting rod 59. The lower end portion of the control handle 56 operates in a slot 60 in the drawbar 26, the movement of said lower end portion relative to the drawbar 26 being adjustable by means of the flow regulator plate 61, which is adjustably secured to the drawbar by the fastener 62. When the control handle 56 is in the position shown in Figure 1, the shutter plates 34 and 35 are moved away from the center bridging member 25 to the closed position. Upon turning the handle 56 in the opposite direction, however, the discharge openings 22 are uncovered, to the extent that the flow regulator plate 61 permits rotational movement of the lower end portion of the control handle 56 along the slot 60.

Referring now to Figure 3, a stub shaft 63 extends through the end wall 15 and is driven by the wheel 64, the bearing support for the shaft 63 including the thrust collar 65, which is secured in place by the fastener 66. A similar stub shaft 63, not shown, is driven by the wheel 67 and extends into the interior of the hopper 10 at the opposite end wall 14. A center brace 68 (Figures 3 and 5) extends between the two upper edges of the bottom plate 11, and supports the bearing 69, said bearing being secured to the brace 68 by the fasteners 70 and 71. A drive shaft 72 is supported at one end thereof by the bearing 69, the other end of the shaft 72 being drivably connected to the stub shaft 63 by the coupling members 73 and 74, and their associated fasteners 75 and 76. A thrust collar 77 is secured to the drive shaft 72 by the fastener 78, while lubricant is supplied to the bearing 69 through the lubricant fitting 79. A second drive shaft 80 is supported at one end thereof by the bearing 69, and is also provided with a thrust collar 81 secured thereto by the fastener 82.

Referring now to Figures 3 and 6, the drive shaft 72 is shown as having a plurality of wobble plates 83 spaced therealong, said plates 83 being inclined approximately 25 degrees from a plane perpendicular to the shafts 72 and 80, although obviously other angles of pitch may be used. Each of the wobble plates 83 includes a major lobe 84 and a minor lobe 85, the respective leading edges 86 and 87 of which are substantially radial and circumferentially spaced from each other approximately 180 degrees. In addition to being larger in area than the minor lobe 85, the major lobe 84 is also proportioned such that the radial distance from the axis of rotation of the shaft 72 to its center of gravity is greater than the radial distance to the center of gravity of the minor lobe 85. Figure 3 shows the wobble plates 83 as being circumferentially spaced around the shaft 72 for a purpose more fully disclosed below, while in addition, Figure 3 shows the coupling members 73 and 74 as including a minor lobe 88 and a major lobe 89, respectively. The drive shaft 80, only one end portion of which is shown, also includes a plurality of wobble plates 90 arranged similarly, except that the wobble plates 90 are pitched opposite the wobble plates 83.

In addition to the wobble plates 83 and 90, the shafts 72 and 80 include a plurality of substantially disk-shaped feed members 91 which operate in the discharge opening 22. Each of the feed members 91 includes a plurality of stepped feeder teeth 92, while the members 91 are so positioned on the drive shafts 72 and 80 as to penetrate into the rectangular portion 23 of the discharge openings 22 adjacent to the unbroken straight edge thereof (Figure 7). In addition, each of the feed members 91 is provided with a pair of tangs 93 and 94, which extend radially to the working circle of the feeder teeth 92, and from which wings 95 and 96 project respectively. Each of the wings 95 and 96 extends to the same side of the feed member 91, and is inclined from the plane of rotation of said member 91 to sweep material away from the feeder teeth 92 as the shaft 72 (or 80) rotates in the direction indicated by the arrows of Figure 3. A breaker arm 97 projects from that side of the feed member 91 which faces the principal discharge area 24, said arm 97 extending radially to substantially the same extent as the feeder teeth 92, so that said arm 97 also penetrates an appreciable amount into the discharge openings 22 during each revolution of the feed member 91. Another breaker arm 98 extends from the opposite side of the feed member 91; however the arm 98 terminates short of the feeder teeth 92, so as not to interfere with the bottom plate 11 upon rotation of the feed member 91. In addition, each of the feed members 91 adjacent to the center bearing 69 and the end thrust collars 65, is provided with an agitator arm 11 which break up cohered or packed material with which it comes into contact.

Advantageously, the shutter plates 34 and 35 can be quickly detached from the hopper 10, for cleaning, repairing, or replacement. To remove the shutter plates 34 and 35, they are first moved as far away from the center bridging member 25 as is possible using the control handle 56. Following this, the cotter pins 50 (only one of which is shown) are removed from the pintles 45 and 51. The straps 43 and 44 are then swung to disengage the eye bolts 47 and 53 from the pintles 45 and 51. A few light hammer blows on the lugs 46 and 52 are all that are necessary to move the shutter plates 34 and 35 along the bottom plate 11 until the notches 36 are in alignment with the fingers 33, after which said shutter plates may be lifted away from the bottom plate 11.

In practice, I prefer that the shutter plates 34 and 35 be formed of spring steel or the like, with a slightly greater radius of curvature, in the unflexed condition, than the bottom plate 11, so that said plates 34 and 35 are slightly flexed upon assembly to the hopper 10. This feature has the advantage of maintaining the shutter plates 34 and 35 snugly against the bottom plate 11, and thus prevents accumulation of material between said plates. To facilitate the installation of the shutter plates 34 and 35 on to the bottom plate 11, in view of the differences in curvature, the ends of the spring fingers 33 are bent outwardly a small distance, as shown in Figure 5. Thus, the plates 34 and 35 may be replaced as quickly as they are removed. This feature of quick detachability is particularly desirable since it permits the ready replacement of the shutter plates 34 and 35 with shutter plates having a different number of apertures therein, as would be the case, for instance, where it is desired to use the device for side dressing. For example, the shutter plates 34 and 35 may each have but two apertures therein, in which case the apparatus will dispense fertilizer or other material in four bands or rows. Because of efficient distribution of material within the hopper 10, and the positive feed action of the feed members 91, the flow of material is uniform from each of the four apertures, even though the effective discharge area may be quite small.

While I have shown and described certain preferred embodiments of my invention, it is to be understood that these embodiments have been given by way of example only and that various changes and rearrangements of the details shown therein may be made without departing from the spirit of the invention, the scope of which is defined in the appended claims.

I claim:

1. A material spreader comprising an elongated hopper having an elongated row of discharge ports in the bottom thereof; a plurality of longitudinally spaced apart fingers secured to said hopper on each side of said row of discharge ports, said fingers being directed toward said row; and a removable shutter for said discharge ports, said shutter comprising an elongated plate with a row of apertures adapted to register in varying degree with said discharge ports, and, on each longitudinal edge of the shutter plate, a plurality of notches longitudinally spaced from one another at distances coinciding with the spacing of the fingers, the individual notches being slightly longer than the corresponding fingers, so that the shutter can be assembled with and disassembled from the hopper with the aid of a longitudinal movement of the shutter covering only part of the length of the hopper.

2. A material spreader including an elongated hopper with an elongated row of discharge ports in the bottom thereof; an elongated shutter plate with apertures positioned and shaped to register in varying degree with said discharge ports, in varying operative positions of the shutter plate, the shutter plate also having two elongated rows of longitudinally spaced notches, one such row in each longitudinal edge of the shutter plate; and two elongated rows of longitudinally spaced fasteners for the shutter plate, each fastener being secured to the hopper and comprising a structure extending outside but adjacent to and substantially parallel with the hopper wall, and the spacing of such fasteners substantially coinciding with the spacing between said notches in the shutter plate.

3. A material spreader as described in claim 2 wherein said notches are positioned substantially between the apertures of the shutter plate.

4. A material spreader as described in claim 3 wherein the number of notches on each longitudinal side of the shutter is substantially the same as the number of apertures in the shutter, thereby providing uniform tightness of closure for each aperture when and as it is closed.

5. A material spreader comprising an elongated hopper with an elongated row of relatively short discharge ports in the bottom thereof; two similarly elongated rows of inwardly directed fingers secured to said hopper, one on each side of said row of discharge ports; a shutter plate having at least one aperture therein, said shutter plate also having a plurality of notches in two parallel edges thereof, each of said notches being at least slightly larger than the corresponding finger but substantially shorter than the shutter edge wherein the notch is formed; the spacing of said ports, apertures, fingers and notches being such that the fingers and notches are registrable only when the apertures are out of register with the discharge ports.

6. A material spreader comprising a feed plate with an elongated series of discharge ports therein; a shutter plate with an elongated series of apertures registrable with the discharge ports in variable degree, said ports and apertures having relatively short length as compared with the length of the hopper, thereby involving a relatively short stroke for the full range of register variation for said discharge ports and apertures; two parallel rows of longitudinally spaced inwardly directed fingers secured to said spreader on opposite sides of said discharge ports; and a shutter having two parallel rows of similarly spaced and slightly larger notches in the edges thereof, thereby allowing assembly and disassembly of the hopper and shutter by means of a stroke of the shutter only slightly beyond the aforementioned stroke length.

7. A material spreader comprising a feed plate with an elongated row of short discharge ports therein; a shutter plate with an elongated row of similarly short, variably registrable apertures spaced similarly to the discharge ports; two parallel rows of longitudinally spaced fasteners secured to said spreader on opposite sides of said discharge ports, each fastener having a holder means having extension toward the series of discharge ports and resiliently bearing against the feed plate; and the shutter plate having two parallel rows of similarly spaced slightly larger recesses, dimensioned to allow insertion therein of the resilient portions of the fastener means, and spaced to allow variable registration therewith, but not to allow registration therewith when said feed ports and apertures register with one another.

8. A material spreader comprising a feed plate with an elongated row of discharge ports therein; two parallel rows of longitudinally spaced fasteners secured to said plate and comprising inwardly directed holders on opposite sides of said discharge ports; a shutter strip having at least one aperture therein adapted to register in varying degrees with at least one of the discharge ports, said shutter strip being formed of resilient material and having a slightly greater radius of curvature in the unflexed condition than has said feed plate, said shutter strip further having two sets of edge indentations, one set on each longitudinal side thereof, registrable with said fasteners when and only when said strip is in a position in which said aperture is out of register with the corresponding discharge port, and the fasteners being adapted to hold the shutter strip in flexed condition when assembled to said feed plate.

FORTUNATO S. AJERO.

References Cited in the file of this patent

UNITED STATES PATENTS

| Number | Name | Date |
|---|---|---|
| 1,155,204 | Birnstock | Sept. 28, 1915 |
| 1,173,503 | Goetzke | Feb. 29, 1916 |
| 1,959,364 | Hothersall | May 22, 1934 |
| 2,510,231 | Juzwiak | June 6, 1950 |
| 2,541,008 | Stahmer II et al. | Feb. 6, 1951 |